US009562583B2

(12) United States Patent
Kondor

(10) Patent No.: US 9,562,583 B2
(45) Date of Patent: Feb. 7, 2017

(54) ELASTIC JOINT FOR A WHEEL SUSPENSION OF A MOTOR VEHICLE

(71) Applicant: ANVIS DEUTSCHLAND GMBH, Steinau an der Strasse (DE)

(72) Inventor: Jozsef Kondor, Steinau an der Strasse (DE)

(73) Assignee: Anvis Deutschland GmbH, Steinau an der Strasse (DE)

( * ) Notice: Subject to any disclaimer, the term of this patent is extended or adjusted under 35 U.S.C. 154(b) by 257 days.

(21) Appl. No.: 13/722,084

(22) Filed: Dec. 20, 2012

(65) Prior Publication Data

US 2013/0164077 A1   Jun. 27, 2013

(30) Foreign Application Priority Data

Dec. 21, 2011   (DE) .......................... 10 2011 121 831

(51) Int. Cl.
  *F16F 1/38*   (2006.01)
  *F16F 1/393*   (2006.01)

(52) U.S. Cl.
  CPC ............... *F16F 1/3835* (2013.01); *F16F 1/38* (2013.01); *F16F 1/393* (2013.01); *Y10T 403/451* (2015.01)

(58) Field of Classification Search
  CPC ............. F16F 1/38; F16F 1/3835; F16F 1/393
  USPC ....... 403/124, 125, 132, 133, 135, 220–223,
  403/225–228, 369; 464/83, 85;
  267/140.12, 267/141.2, 131.3, 141.6, 293;
  280/124.177
  See application file for complete search history.

(56) References Cited

U.S. PATENT DOCUMENTS

| | | | | |
|---|---|---|---|---|
| 3,038,743 A | * | 6/1962 | Zaloumis | ...................... 285/51 |
| 3,713,306 A | * | 1/1973 | Muhlhausler | ................... 464/83 |
| 4,129,394 A | * | 12/1978 | Eichinger et al. | ............. 403/57 |
| 4,257,242 A | * | 3/1981 | Domer et al. | .................. 464/76 |
| 4,274,268 A | * | 6/1981 | Taig | ............................... 464/110 |
| 5,013,012 A | * | 5/1991 | Jouade | .................... 267/140.12 |
| 5,383,811 A | * | 1/1995 | Campbell et al. | .............. 464/89 |
| 5,556,071 A | * | 9/1996 | Bellamy | ............. F16F 13/1481 |
| | | | | 248/636 |
| 5,769,380 A | * | 6/1998 | Hibi et al. | .................. 267/141.2 |
| 6,164,829 A | * | 12/2000 | Wenzel et al. | ................ 384/203 |
| 6,254,114 B1 | * | 7/2001 | Pulling et al. | ........... 280/93.511 |
| 6,398,446 B1 | * | 6/2002 | Pazdirek et al. | .............. 403/134 |
| 2002/0000688 A1 | * | 1/2002 | Simuttis | .................. F16F 13/10 |
| | | | | 267/140.13 |
| 2002/0008342 A1 | * | 1/2002 | Breitfeld | ................. F16F 13/16 |
| | | | | 267/140.12 |

(Continued)

FOREIGN PATENT DOCUMENTS

DE   3906079 A1 *  9/1989 ............... B60G 7/12
EP   1505311 A1   2/2005

(Continued)

*Primary Examiner* — Daniel P Stodola
*Assistant Examiner* — Jonathan Masinick
(74) *Attorney, Agent, or Firm* — Dennis J. Williamson; Moore & Van Allen PLLC

(57) ABSTRACT

An elastic joint, in particular for a wheel suspension of a motor vehicle. The joint includes an inner armature, an outer armature surrounding the inner armature, wherein the armatures define an axial direction and two radial directions perpendicular to the axial direction as well as perpendicular to each other and disposed in a circumferential plane, and an elastomeric body for the mutual elastic retention of the armatures, wherein the elastomeric body consists of at least four connecting columns respectively extending from the inner armature to the outer armature.

34 Claims, 4 Drawing Sheets

(56) References Cited

U.S. PATENT DOCUMENTS

| | | | | |
|---|---|---|---|---|
| 2004/0056397 | A1* | 3/2004 | Tatura | F16F 1/387 |
| | | | | 267/140.12 |
| 2005/0191120 | A1 | 9/2005 | Oellers | |
| 2007/0246870 | A1* | 10/2007 | Siemer | 267/140.12 |
| 2008/0164645 | A1* | 7/2008 | Bost et al. | 267/140.12 |
| 2009/0288297 | A1* | 11/2009 | Schmidt et al. | 29/898.052 |
| 2010/0109213 | A1* | 5/2010 | Schnaars | F16F 13/1481 |
| | | | | 267/140.12 |

FOREIGN PATENT DOCUMENTS

| | | | |
|---|---|---|---|
| GB | 2115080 A | | 9/1983 |
| JP | 2006307981 A | | 11/2006 |
| WO | WO 2009090071 A2 | * | 7/2009 |

\* cited by examiner

ELASTIC JOINT FOR A WHEEL SUSPENSION OF A MOTOR VEHICLE

CROSS-REFERENCE TO RELATED APPLICATIONS

This application claims priority benefits under 35 U.S.C. §119(a) to German Patent Application No. DE 10 2011 121 831.2, entitled "Elastic Joint, in Particular for a Wheel Suspension of a Motor Vehicle," and filed Dec. 21, 2011, the contents of which are incorporated by reference herein in their entirety.

BACKGROUND

Aspects of the invention relate to an elastic joint, in particular for a wheel suspension of a motor vehicle, and may relate in particular to a rear wheel suspension of the vehicle.

In the modern motor vehicle technology it is known, in particular for the rear wheel suspension of a passenger car as well as for a motor lorry, to realize so called elastic mountings or elastic joints, the principal structure of which is formed by a rigid inner armature, in particular made of metal, like a rigid sleeve or a support rod, an outer armature like an outer sleeve, and an elastomeric body disposed between the armatures. The elastomeric body serves to separate, in particular acoustically insulate, the vehicle body from the vibration loaded wheels. Also the high occurring dynamic vehicle loads are to be born in the elastic joints. There is a large number of designs of elastic joints, the elastomeric bodies of which are usually formed by a purely elastic material, wherein hydraulic functional components may also be added.

Aspects of this disclosure are directed in particular towards the elastic joints having a spring body of merely elastomeric material between the rigid armatures.

From EP 1 505 311 A1 a bearing bush is known for a motor vehicle, the bearing bush having a sleeve-shaped, rigid inner armature as well as a sleeve-shaped outer sleeve of weaker form, between which an elastomeric body is injection molded. The outer sleeve is provided with a restriction for the adjustment of the spring characteristic of the elastomeric body, whereby two elastomeric sections are formed, the deformations of which influence each other respectively. In order to reduce the stiffness of the bearing bush in one radial direction so that the bearing bush is soft in one radial direction and stiffer in the other, a recess is realized in the elastomeric body along part of the circumference.

An elastically resilient pivot joint for the mutually pivoting connection of a wheel trunk with a guide member is known from DE 32 05 716 C2. The elastomeric body vulcanized between the armatures can be partitioned into two circular sections with different strength in the radial direction by means of a central bulge. An embodiment of an elastic joint, similar thereto, is known from KR 2009 009 8978, in which the partition by sections of the elastomeric body is realized by a restriction in the outer armature.

It became apparent in the known elastic joints, in particular for motor vehicles, that the ratio of axial stiffness versus radial stiffness, which is an important characteristic for automotive engineers, cannot be realized to be sufficiently high. Ratios of little above 1.0 are common. For automotive engineers it is of particular interest to have a high stiffness ratio, wherein a cardanic stiffness remains as low as possible.

In order to structurally optimize these characteristics, the cost effect and the weight/usage ratio is of course not to be neglected but in particular should also be optimized.

A need therefore exists for an elastic joint, in particular for a wheel suspension of a motor vehicle, in which the ratio of axial stiffness over radial stiffness is high for a low cardanic stiffness while using cost effective and light materials.

SUMMARY

In accordance with one embodiment, the elastic joint comprises an inner armature, an outer armature surrounding the inner armature, wherein the armatures define an axial direction and two radial directions perpendicular to the axial direction as well as perpendicular to each other and disposed in a circumferential plane, and an elastomeric body for the mutual elastic support of the armatures. According to certain embodiments, the elastomeric body consists of at least four connecting columns respectively extending from the inner armature to the outer armature. Herein "connecting column" signifies an arm-like or rod-like structure that does precisely not revolve in the circumferential direction of the elastic joint. The respective connecting columns extend in the radial direction in order to establish a respective stiffness in this direction.

With the connecting columns, which may be arranged in any way with respect to each other wherein preferred positions relative to each other are given in the following explanations, a reduction of the radial stiffness is achieved without having to accept reductions too large for the axial stiffness. For the elastic joint with an exclusively elastomeric spring, that is, without hydraulic damping measures, the connecting columns are in fact the means that elastically connect the armatures with each other for enabling elastic vibrations. In an embodiment of the elastic joint as a so-called hydro bushing or hydroelastic joint, the connecting columns serve as reinforced delimiting walls of the hydraulic working camber and connect the armatures, wherein the sections free of connecting columns are realized by membrane sections, whereby a very good hydraulic adjustability of the hydrodynamic joint can be achieved.

In a preferred embodiment of the invention the connecting columns are made from one piece of elastomeric material. Therein the connecting columns, preferably their column bodies extending rectilinearly, are structurally separated from each other such that the mere deformation of a connecting column, for example in case of a radial loading, does not affect the deformation behavior of the other connecting columns, in particular of the neighboring connecting columns.

In this way it is possible to adjust the radial stiffness independently of the radial direction. In a preferred embodiment of the invention the column bodies of the connecting columns are essentially formed identically.

The connecting columns, in particular the column bodies, are arranged without contact along their column bodies in an extension direction so that a deformation of one connecting column does not affect the neighboring column. In a further development of certain embodiments, the at least four connecting columns are allocated to each other as pairs of connecting columns arranged axially symmetrically with respect to the axial direction. One pair of connecting columns is arranged circumferentially offset with respect to another pair of connecting columns. Therein the connecting columns of a pair are diametrically opposed in the radial direction. Preferably an offset angle between neighboring pairs is essentially equal, preferably about 90°. The connecting columns can extend about 30° in the circumferential direction so that seen in the axial direction soft areas free of elastomer with a circumferential width of 30° are realized for an offset angle of 90°.

For such an arrangement a particularly large stiffness ratio, notably of 1.4, of axial versus radial stiffness is realized. Therein a low cardanic stiffness is provided. Such a radial stiffness ratio can be achieved without using high grade materials or engaging in intensive production effort.

In a preferred embodiment the elastic joint has a central radial plane that preferably partitions the elastic joint into two equally dimensioned joint sections. One pair of connecting columns is arranged on one side of the central radial plane whereas another pair of connecting columns is disposed on the opposite side of the central radial plane.

In a preferred embodiment of the invention the connecting columns, in particular their column bodies define an extension direction, preferably a central axis, to be inclined with respect to the radial directions. Preferably a directional component of the extension direction in radial direction is larger than in axial direction, preferably between 50° and 70°.

In a preferred embodiment of the invention the angles of inclination of all the extension directions of the connecting columns are adjusted to each other, in particular selected to be of equal size, such that a stiffness of the elastic joint in axial direction increases when the elastomeric body, which elastically deforms under a load acting in radial direction, enables a relative movement between the inner armature and the outer armature in radial direction. Consequently, for a deformation of the elastomeric body in radial direction a stiffening of the elastomeric body in axial direction is realized. This quality of an increase in axial stiffness for an elastic deformation in radial direction is achieved in particular by the fact that the connecting columns are inclined with respect to the radial direction.

In a preferred embodiment of the invention the connecting columns respectively define an extension direction that is inclined with respect to the radial direction, and the directional component in radial direction of which is larger than in axial direction. This means that the connecting columns have a smaller angle of inclination in radial direction than in axial direction. The geometries, like the contours of the column bodies of the connecting columns and/or the angles of inclination of the extension directions are adjusted to each other such that the elastomeric body, which elastically deforms under a load acting in the radial direction, enables a relative movement between the inner armature and the outer armature in the radial direction. This means that the inner armature does not perform a movement in the axial direction with respect to the outer armature and vice versa in case that an elastic deformation in the radial direction of the elastomeric body is taking place simultaneously. In this way an abutment function of the elastomeric body in axial direction is realized.

In a preferred embodiment of the invention two respective connecting columns, preferably different pairs of connecting columns, are inclined in opposite direction to the radial direction such that deformation forces acting in axial direction, which build up inside the column bodies of the connecting columns owing to the relative movement in the radial direction between the inner armature and the outer armature, have opposite directions and preferably cancel each other out completely, so that, as desired, a relative displacement of the armature in the axial direction is prevented, whereby the desired abutment function is achieved.

Preferably the extension directions of all connecting columns are inclined with respect to the radial direction in an acute angle of between 25° to 65°. It is particularly preferred that all angles of inclination of the connecting columns with respect to the radial direction are selected to be equal.

In a preferred embodiment of the invention the column bodies of the connecting columns respectively define a center axis which, in case of a rotationally symmetric connecting column, may coincide with the axis of rotation. This center axis can be seen as the above mentioned extension direction. Preferably all center axes of the connecting columns meet each other essentially in a common area, preferably even at a common location in the three dimensional space. This area, preferably this location is disposed in particular on the axis of the axial direction of the elastic joint or at least in its vicinity. In a further development of the invention the shape of a cross-section of the column body increases in particular continuously along the center axis from a center section towards both armatures. The cross-sectional plane considered therein is disposed perpendicularly to the center axis. In this way enhanced coupling areas towards the respective armature can be achieved.

A special measure for reducing the radial stiffness without having to accept respective losses of stiffness in axial direction is achieved in that at least an outer surface of the column body facing towards the outside of the joint in axial direction has a concave shape.

With respect to the armatures it is to be noted that they are not necessarily the radially most internal or most external armature, but can also be formed by intermediate armatures like intermediate rings.

In a preferred embodiment of the invention the connecting columns are fixed at an intermediate ring that is coupled via a further elastomeric body of either the outer or the inner armature to the outer or inner armature.

For each connecting column the inner as well as the outer armature may form support surfaces diametrically opposed to each other and in particular axially symmetrical, the perpendiculars of which are disposed parallel to the extension direction of the respective connecting column.

Preferably the outer armature has the shape of an in particular closed housing ring, at the inside of which a protrusion is formed respectively for the formation of a support surface for the connecting column. Therein the ring structure and the protrusion may be made of one plastic piece.

In an embodiment of the elastic joint the outer armature may be realized by a combination of an intermediate ring sleeve of lesser strength and an outer ring sleeve that are coupled to each other by a completely circumferential elastomeric body section.

In a preferred embodiment of the invention the inner armature is formed by a rod-like basic structure, the center area of which is formed with a point-symmetrical radial bulge for the formation of support surfaces for the connecting columns. The bulge may be preferably axially symmetrical with respect to a radial direction that may be defined by a radial center plain. The support surfaces are preferably formed only in a transition area between a base of the bulge and a bulge maximum.

In a preferred embodiment of the invention a ball joint is inserted into the inner sleeve in order to reduce the cardanic stiffness and the rotational stiffness for the inner armature. In this way the service life and the strength can be increased significantly.

In an alternative embodiment of the elastic joint as a hydroelastic joint the at least four connecting columns form support spring elements that simultaneously form the delimiting walls of the hydraulic working chambers, wherein the areas without connecting column are realized by membrane segments.

BRIEF DESCRIPTION OF THE DRAWINGS

Further advantages, qualities and features will become clear from the following description of preferred embodiments of the invention in conjunction with the accompanying drawings.

DETAILED DESCRIPTION

In the following figure descriptions, components of the elastic joint according to embodiment of the invention are first explained by means of the FIGS. 1 to 5. The description of the further embodiments refers, if necessary, to corresponding same or similar components without explaining them anew for the respective embodiment.

Figure 1:
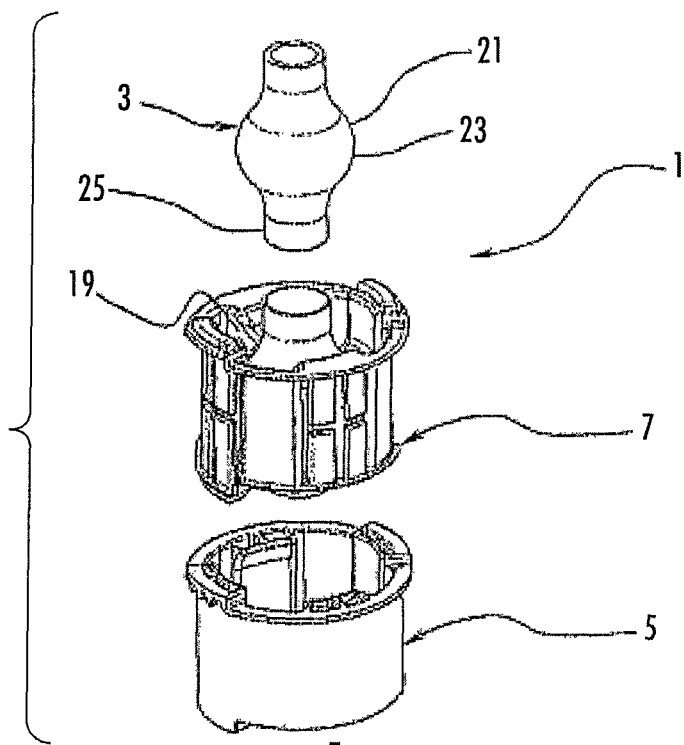
FIG. 1 is an exploded view of a first embodiment of the invention.
Figure 2:
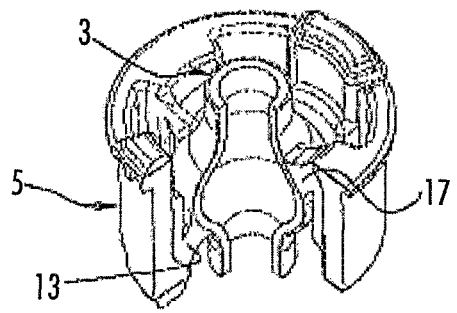
FIG. 2 is a partial perspective sectional view of the embodiment of the elastic joint according to FIG. 1.

In FIG. 1 the elastic joint for a wheel suspension of a motor vehicle is generally given the reference numeral 1. The elastic joint, which has a purely elastomeric spring component without an additional hydraulic function, consists essentially of three components, that is, an inner armature 3, an outer armature 5 and an elastomeric spring body 7 arranged between the armatures 3, 5, which, besides elastomer material, may also have rigidification components made of metal or plastic.

As evident from FIGS. 1 to 5, the elastomeric body has no fully circumferential coupling structure between the armatures 3, 5, but is realized in sections by recess 11, that may extend completely in axial direction through the elastic joint. By means of this recess it is possible that a vulcanizing tool can enter the inside of the elastomeric body from both sides of the elastic joint, whereby the manufacturability of the elastic joint is simplified.

The elastomeric body 7 has four connecting columns 13 to 19, the column bodies of which are structurally separated from each other, so that they can deform elastically without influencing the other connecting columns. The connecting columns 13 to 19 present a center axis M that is inclined with respect to the radial direction R as well as to the axial direction Z.

The connecting columns 13 to 19 extend along the center axis M essentially rectilinearly from the inner armature 3 to the outer armature 5.

The inner armature 3 is formed by a sleeve having a rotational shape. The rotational shape is realized by a bulge 21 formed in the middle section and axially symmetrical with respect to a radial center plane Y. The bulge continuously decreases from a bulge maximum, that has no inclination in axial direction Z, towards ends of the sleeve, which are realized essentially cylindrically.

Cambered support surfaces are provided for the respective connecting column in the bulge area between the bulge maximum 23 and the cylindrical end section 25. Therein the inclination of the bulge 21 is realized such that the connecting column, in particular its center axis, points perpendicularly into the inner armature 3.

Also the outer armature is realized by a point-symmetrical rotational sleeve shape that presents a protrusion or offset section 27 at its ends in the area of the connecting columns, wherein the support surface is realized essentially by an area of transition between the offset section and the remaining section of the sleeve. The center axis of the connecting column is also disposed perpendicularly with respect to the area of transition towards the offset section 27.

Figure 3:
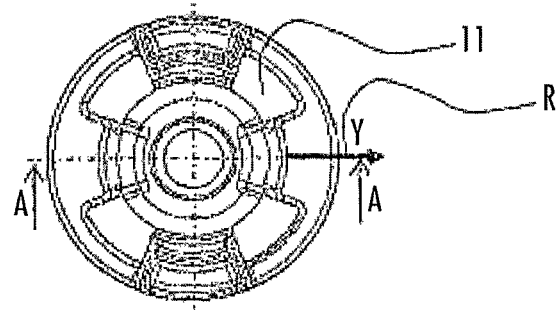
FIG. 3 is a side view in axial direction of the elastic joint according to FIGS. 1 and 2.
Figure 4:
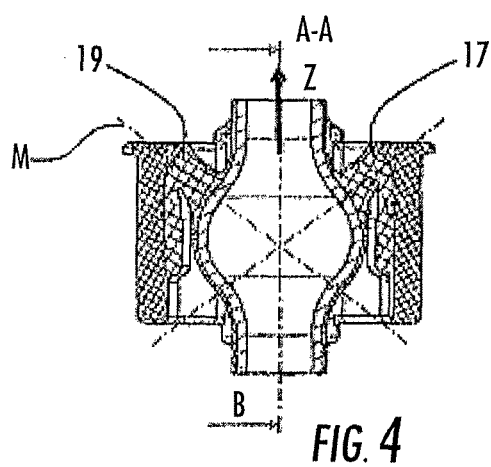
FIG. 4 is a cross-sectional view along the section line A-A according to FIG. 3.
Figure 5:
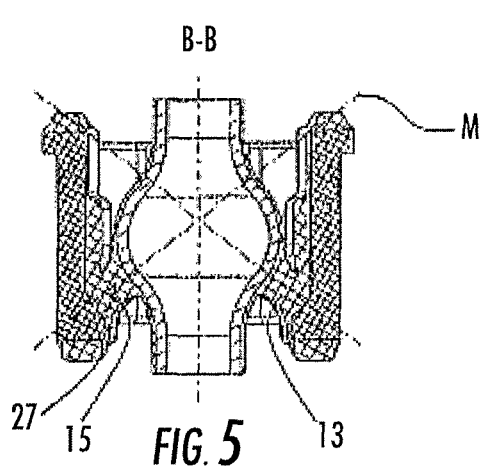
FIG. 5 is a sectional view along the section line B-B according to FIG. 4.
Figure 6:
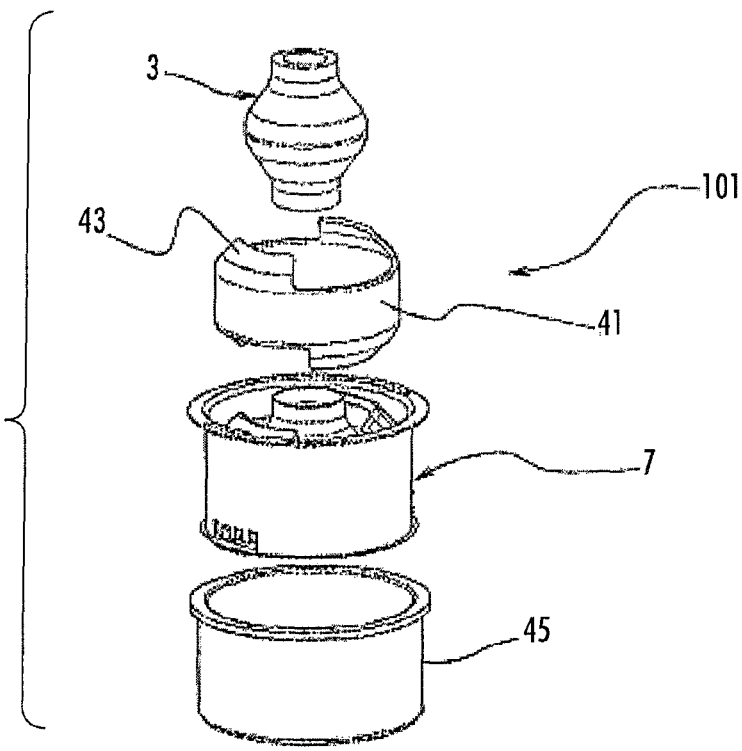
FIG. 6 is an exploded view of a second embodiment of the invention.
Figure 7:
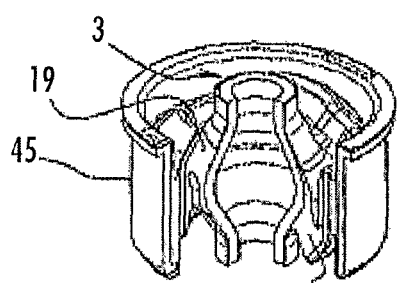
FIG. 7 is a partial perspective sectional view of the elastic joint according to FIG. 6.
Figure 8:
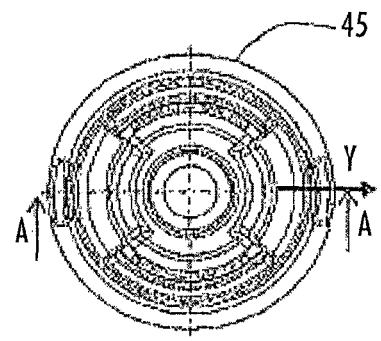
FIG. 8 is a side view in axial direction of the elastic joint according to FIGS. 6 and 7.
Figure 9:
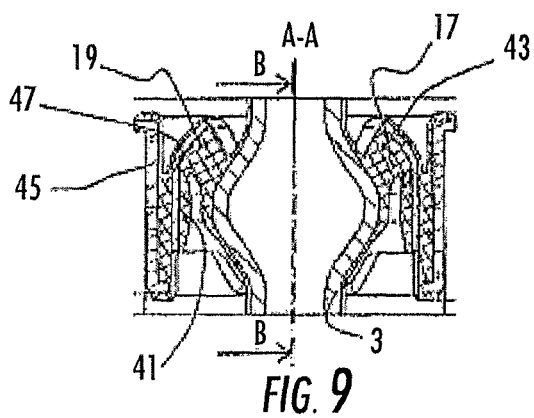
FIG. 9 is a sectional view along the section line A-A according to FIG. 8.
Figure 10:
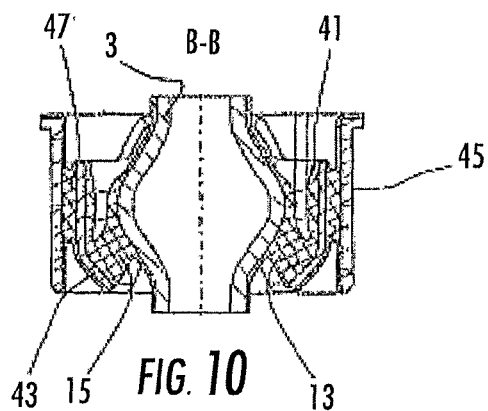
FIG. 10 is a sectional view along the section line B-B according to FIG. 9.
Figure 11:
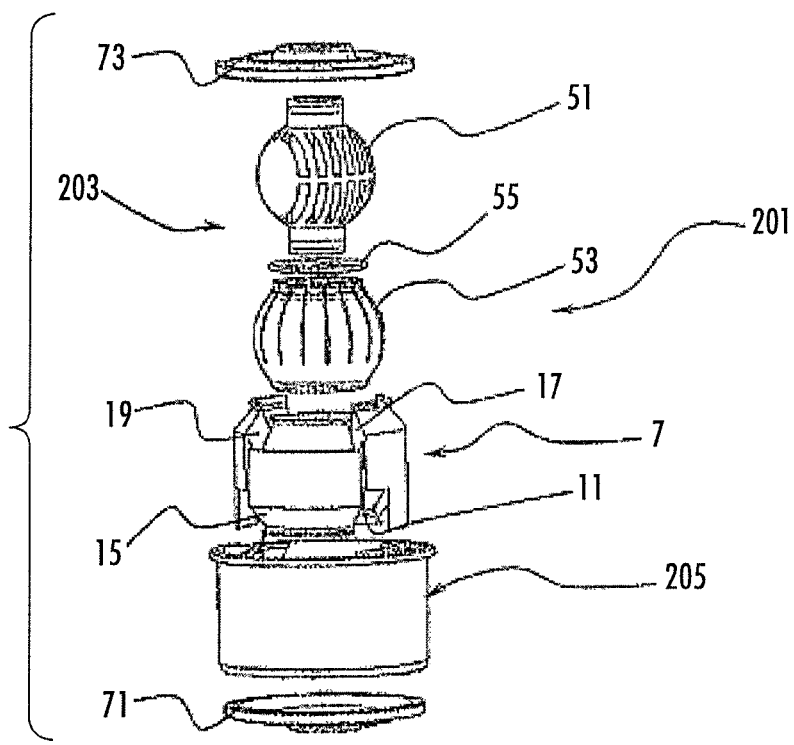
FIG. 11 is an exploded view of a third embodiment of the invention.
Figure 12:
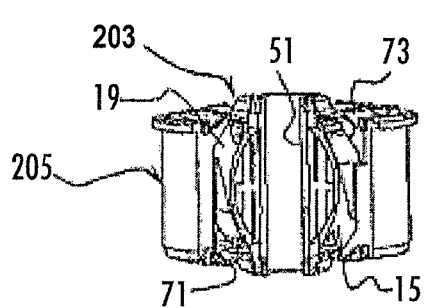
FIG. 12 is a partial perspective sectional view of the elastic joint according to FIG. 11.
Figure 13:
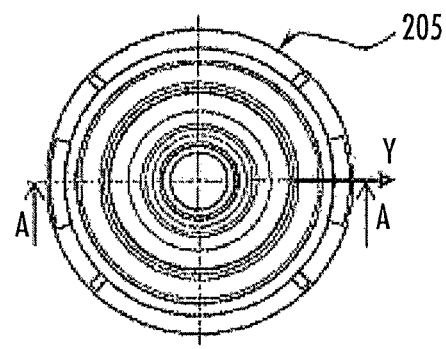
FIG. 13 is a side view in axial direction of the elastic joint according to FIGS. 11 and 12.
Figure 14:
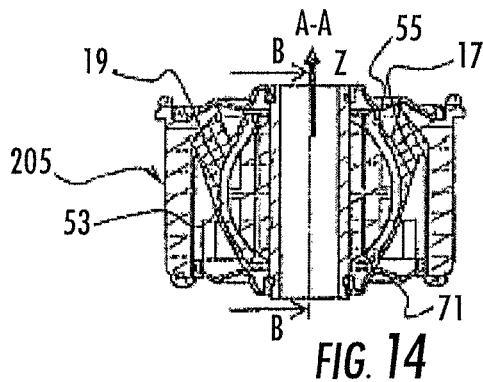
FIG. 14 is a sectional view along the section line A-A according to FIG. 13.
Figure 15:
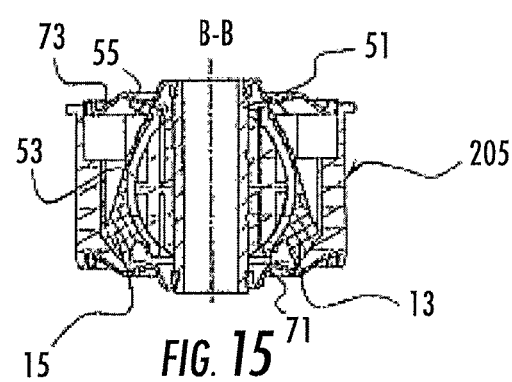
FIG. 15 is a sectional view along the section line B-B according to FIG. 14.

As visible in FIG. 3, the respective connecting columns extend in circumferential direction within an angular range of about 30°. Two pairs of connecting columns 13, 15 and 17, 19 are provided, wherein the connecting columns 13, 15 and 17, 19 are disposed in the radial direction in diametrically opposed positions. The pairs themselves are offset to each other by 90° so that when seen in the axial direction the transition spaces 11 are formed.

The embodiment according to FIGS. 6 to 10, shown generally by reference numeral 101, differs from the elastic joint according to FIGS. 1 to 5 with respect to the structure of the outer armature. This outer armature has additionally an intermediate ring 41 presenting an inclined section 43 at an axial end in order to realize the support surface for the respective connecting column 13 to 19.

Approximately radially externally a revolving outer sleeve 45 is disposed which is coupled elastically with the intermediate ring 41 via a completely revolving ring body 47.

The embodiment according to FIGS. 11 to 15, shown generally by reference numeral 201 differs from the basic embodiment according to FIGS. 1 to 5 in that the cardanic stiffness and the rotational stiffness is reduced, whereby the service life and the strength of the elastic joint is improved. To this end the elastic joint additionally has a ball joint realized in the inner armature. To this end a ball head 51 is inserted into the slotted inner armature 53. A retainer ring 55 belts the slotted inner armature 53 after insertion of the ball head 51. The elastic joint is covered at its axial ends by a top cap 71 and a bottom cap 73 closing the space between the armatures 203, 205 and thereby preventing dirt from entering the joint.

Figure 16:
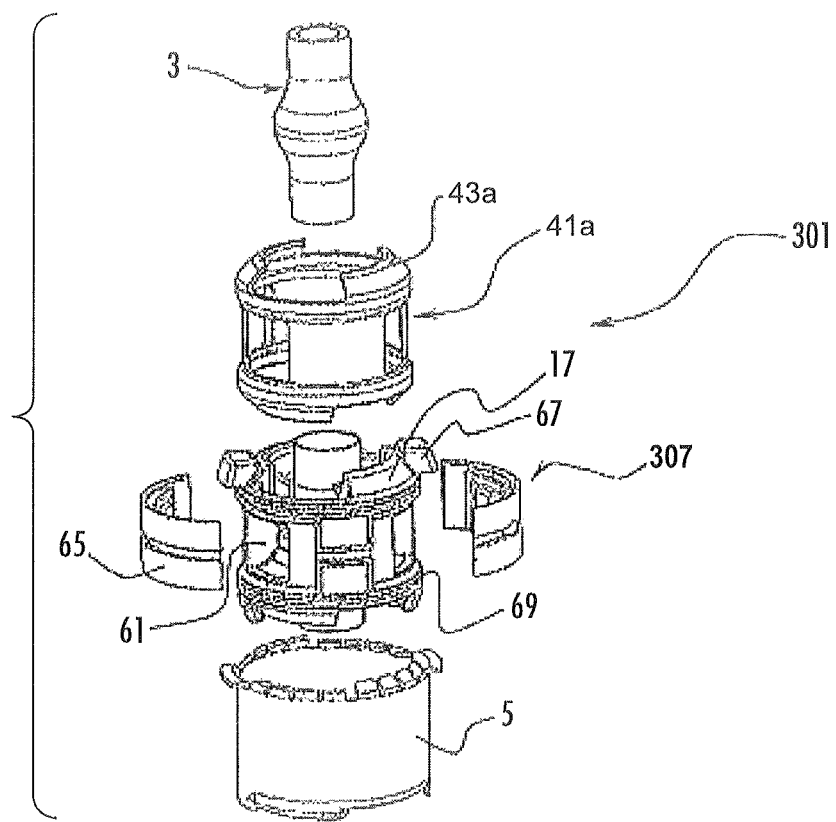
FIG. 16 is an exploded view of a fourth embodiment of the invention.
Figure 17:
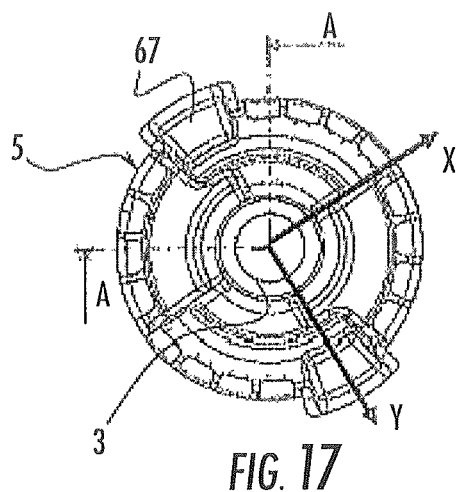
FIG. 17 is a side view in axial direction of the elastic joint according to FIG. 16.
Figure 18:
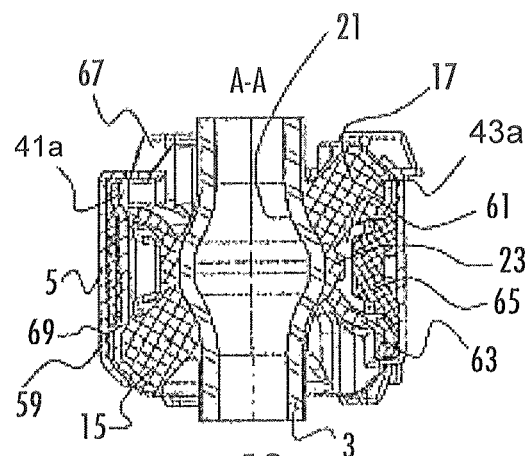
FIG. 18 is a sectional view along the section line A-A according to FIG. 17.

The embodiment according to FIGS. 16 to 18, shown generally by reference numeral 301, differs from the basic embodiment according to FIGS. 1 to 5 in that alongside the purely elastomeric spring function it has integrated a hydraulic damping mechanism, into which a hydraulic working chamber 61 is fitted. The hydraulic working chamber is delimited into sections by the connecting columns 13 to 19. Additionally the hydraulic working chamber is delimited by a membrane structure 63 at the sections where no connecting column is formed. Further, a removable closure element 65 is provided to allow filling of the hydraulic working chamber with a fluid in a pre-installation condition and sealingly closing of the hydraulic working chamber in an installation condition. Circumferential serrations 69 are formed on the elastomeric spring body 307 to fit into corresponding serrations 59 formed on the outer armature 5. A bedstop 67 protrudes axially and radially from the elastomeric spring body 307. In contrast to the embodiment according to FIGS. 1 to 5 a radial abutment 23 made of elastomer material is now realized at the bulge 21 of the inner armature. This outer armature 5 has an intermediate ring 41a presenting an inclined section 43a at an axial end in order to realise the support surface for the respective connecting columns.

The features disclosed in the above description, the figures and the claims may be relevant for the realization of the invention in its different embodiments individually as well as in any combination.

LIST OF REFERENCE NUMERALS 1 elastic joint
3 inner armature
5 outer armature
7 elastomeric spring body
11 recess
13, 15, 17, 19 connecting columns
21 bulge
23 bulge maximum
25 cylindrical end section
27 offset section
41 intermediate ring
43 inclined section
45 outer sleeve
47 ring body
51 ball head
53 slotted inner armature
55 retainer ring
59 serrations
61 hydraulic working chamber
63 membrane structure
65 closure element
67 bedstop
69 serrations
71 top cap
73 bottom cap
101 elastic joint
201 elastic joint
203 inner armature
205 out armature
301 elastic joint
307 spring body
M center axis
R radial direction
Z axial direction
Y radial center plane

What is claimed is:

1. An elastic joint for a wheel suspension of a motor vehicle, comprising:
    an inner armature;
    an outer armature surrounding the inner armature, wherein the armatures define an axial direction and two radial directions perpendicular to the axial direction as well as perpendicular to each other and disposed in a circumferential plane; and
    an elastomeric body comprising a first portion vulcanized to the inner armature and a second portion fixed to the outer armature for the mutual elastic retention of the inner armature and the outer armature, wherein the elastomeric body includes at least four connecting columns respectively extending from the inner armature to the outer armature wherein the at least four connecting columns are elastically deformable in the radial direction to elastically connect the inner armature to the outer armature and are spaced from one another along the elastomeric body such that the deformation of one of the at least four connecting columns does not affect the deformation behavior of any other one of the at least four connecting columns and wherein the at least four connecting columns are allocated to each other as pairs and one pair of the pairs of connecting columns is arranged circumferentially offset with respect to another pair of the pairs of connecting columns wherein the one pair of the pairs of connecting columns is disposed on one side of a central radial plane of the joint and the another pair of the pairs of connecting columns is disposed on the opposite side of the central radial plane.

2. The elastic joint according to claim 1 wherein the elastomeric body is made from one piece of elastomeric material.

3. The elastic joint according to claim 2, wherein each of the at least four connecting columns comprise column bodies that extend rectilinearly.

4. The elastic joint according to claim 3, wherein the at least four connecting columns are arranged without contact along their respective column bodies in a respective extension direction.

5. The elastic joint according to claim 1, wherein the pairs of connecting columns are arranged axially symmetrically with respect to the axial direction.

6. The elastic joint of claim 5, wherein offset angles between neighboring pairs of connecting columns are essentially equal.

7. The elastic joint of claim 6, wherein the offset angles are about 90 degrees.

8. The elastic joint according to claim 1, wherein the at least four connecting columns each respectively define an extension direction that is inclined with respect to a corresponding radial direction and the directional component of which in the corresponding radial direction is larger than in the axial direction, wherein angles of inclination of the extension direction of each of the at least four connecting columns are of equal size, such that a stiffness of the elastic joint in the axial direction increases when the elastomeric body, which elastically deforms under a load acting in the corresponding radial direction, enables a relative movement between the inner armature and the outer armature in the first radial direction.

9. The elastic joint according to claim 1, wherein the at least four connecting columns comprise column bodies, wherein the at least four connecting columns each respectively define an extension direction that is inclined with respect to a corresponding radial direction and the directional component of which in the corresponding radial direction is larger than in the axial direction, wherein the geometries, including contours of the column bodies of the at least four connecting columns, angles of inclination of the extension directions, or a combination thereof are configured such that the elastomeric body, which elastically deforms under a load acting in the corresponding radial direction, enables a relative movement between the inner armature and the outer armature in the corresponding radial direction, without a relative displacement of the armatures in the axial direction.

10. The elastic joint according to claim 1, wherein the at least four connecting columns comprise column bodies, wherein a first two connecting columns of the at least four connecting columns are inclined in a first direction to a corresponding radial direction and a second two connecting columns of the at least four connecting columns are inclined in a second direction to a corresponding radial direction, the second direction being opposite to the first direction such that deformation forces acting in the axial direction inside the column bodies of the at least four connecting columns, owing to the relative movement in the corresponding radial direction between the inner armature and the outer armature, have an opposite direction in the first two connecting columns than in the second two connecting columns, so that a relative displacement of the armatures in axial directions is prevented.

11. The elastic joint according to claim 10, wherein the deformation forces cancel each other out completely, so that a relative displacement of the armature in the axial direction is prevented.

12. The elastic joint according to claim 1, wherein the at least four connecting columns each respectively define an extension direction that is inclined with respect to a corresponding one of the two radial directions, wherein the extension direction for each of the at least four connecting columns is inclined with respect to the respective corresponding radial direction in an acute angle of between 25 degrees and 65 degrees.

13. The elastic joint according to claim 1, wherein the at least four connecting columns comprise column bodies, wherein the at least four connecting columns each respectively define an extension direction that is inclined with respect to a corresponding radial direction the, axial direction defines an axis, and wherein the at least four connecting columns respectively define a center axis that defines the extension direction, wherein all center axes meet each other essentially in a common area located substantially on the axis of the axial direction.

14. The elastic joint according to claim 1, wherein the at least four connecting columns comprise column bodies, wherein a cross-section area of each column body increases along the column body from a center of the column body towards the inner armature and the outer armature.

15. The elastic joint according to claim 1, wherein the at least four connecting columns comprise column bodies, wherein each column body presents an outer surface facing in the axial direction towards the outside of the elastic joint and having a concave shape as seen from the outside.

16. The elastic joint according to claim 1, wherein for each of the at least four connecting columns the inner armature and the outer armature form support surfaces diametrically opposed to each other and axially symmetrical, where lines perpendicular to the support surfaces are disposed parallel to an extension direction of the respective connecting column.

17. The elastic joint according to claim 1, wherein the outer armature presents a closed housing ring, at the inside of which ring a protrusion is formed respectively for the formation of a support surface.

18. The elastic joint of claim 17, wherein the ring and the protrusion are molded out of one plastic piece.

19. The elastic joint according to claim 1, wherein the inner armature forms a rod-like basic structure, a center area of the inner armature being formed with a point-symmetrical radial bulge for the formation of support surfaces for the at least four connecting columns, wherein in particular the support surfaces are only formed in a transition area between a base of the bulge and a bulge maximum.

20. The elastic joint of claim 19, wherein the point-symmetrical radial bulge is axially symmetrical with respect to a radial center plane.

21. The elastic joint according to claim 19, wherein at an inside of the outer armature, at an outside of the inner armature, or a combination thereof, and at the bulge of the inner armature, an elastomeric abutment is provided that extends circularly and in a circumferential direction.

22. The elastic joint according to claim 1, wherein the elastic body is configured such that a single vulcanization tool can enter the inside of the elastic body from both sides of the elastic joint.

23. The elastic joint according to claim 1 wherein the elastomeric body comprises sections realized by recesses that extend completely in the axial direction through the elastic joint wherein the at least four connecting columns are spaced from each other by the recesses.

24. The elastic joint according to claim 1 wherein the radial stiffness of at least one of the at least four connecting columns is different than the radial stiffness of at least one other one of the at least four connecting columns.

25. The elastic joint according to claim 1 wherein the difference ratio of an axial stiffness versus the radial stiffness of the elastic joint is above 1.0.

26. The elastic joint according to claim 25, wherein the difference ratio of axial stiffness versus radial stiffness of the elastic joint is about 1.4.

27. The elastic joint according to claim 1 wherein the elastomeric body provides a cardanic stiffness for the elastic joint.

28. An elastic joint for a wheel suspension of a motor vehicle, comprising:
an inner armature;
an outer armature surrounding the inner armature, wherein the inner armature and the outer armature define an axial direction and two radial directions perpendicular to the axial direction as well as perpendicular to each other and disposed in a circumferential plane;
an elastomeric body comprising a first portion fixed to the inner armature at an interface such that the inner armature is fixed against rotational movement relative to the elastomeric body at the interface and a second portion fixed to the outer armature for the mutual elastic retention of the inner armature and the outer armature, wherein the elastomeric body includes at least four connecting columns respectively extending from the inner armature to the outer armature,
and a hydraulic working chamber delimited by said at least four connecting columns and wherein the at least four connecting columns sectionally delimit the hydraulic working chamber into sections and wherein the hydraulic working chamber comprises a membrane structure that delimits the chamber in an axial direction where no connecting column is formed.

29. The elastic joint according to claim 28 wherein a removable closure element is provided to allow filling of the hydraulic working chambers with a fluid in a pre-installation condition and for sealingly closing of the hydraulic working chamber in an installation condition.

30. An elastic joint for a wheel suspension of a motor vehicle, comprising:
  an inner armature;
  an outer armature surrounding the inner armature, wherein the inner armature and the outer armature define an axial direction and two radial directions perpendicular to the axial direction as well as perpendicular to each other and disposed in a circumferential plane;
  and an elastomeric body comprising a first portion fixed to the inner armature at an interface such that the inner armature is fixed against rotational movement relative to the elastomeric body at the interface and a second portion fixed to the outer armature for the mutual elastic retention of the inner armature and the outer armature, wherein the elastomeric body includes at least four connecting columns respectively extending from the inner armature to the outer armature, wherein the at least four connecting columns are elastically deformable in the radial direction to elastically connect the inner armature to the outer armature, wherein the deformation of one of the connecting columns does not affect the deformation behavior of any other of the at least four connecting columns;
  wherein the elastic joint has a central radial plane that partitions the elastic joint into two essentially equally dimensioned joint sections.

31. The elastic joint according to claim 30, wherein the difference ratio of an axial stiffness versus a radial stiffness of the elastic joint is above 1.0.

32. The elastic joint according to claim 31, wherein the difference ratio of the axial stiffness versus the radial stiffness of the elastic joint is realized by about 1.4.

33. The elastic joint according to claim 30 wherein the elastomeric body provides a cardanic stiffness for the elastic joint.

34. An elastic joint for a wheel suspension of a motor vehicle, comprising:
  an inner armature;
  an outer armature surrounding the inner armature, wherein the armatures define an axial direction and two radial directions perpendicular to the axial direction as well as perpendicular to each other and disposed in a circumferential plane; and
  an elastomeric body comprising a first portion fixed to the inner armature at an interface such that the inner armature is fixed against rotational movement relative to the elastomeric body at the interface and a second portion fixed to the outer armature for the mutual elastic retention of the inner armature and the outer armature, wherein the elastomeric body includes at least four connecting columns respectively extending from the inner armature to the outer armature wherein the at least four connecting columns are elastically deformable in the radial direction to elastically connect the inner armature to the outer armature and are spaced from one another along the elastomeric body such that the deformation of one of the at least four a connecting columns does not affect the deformation behavior of any other one of the at least four connecting columns.

* * * * *